July 21, 1970  G. WAHLE  3,521,031
HEAT SEALING APPARATUS
Filed Sept. 21, 1966
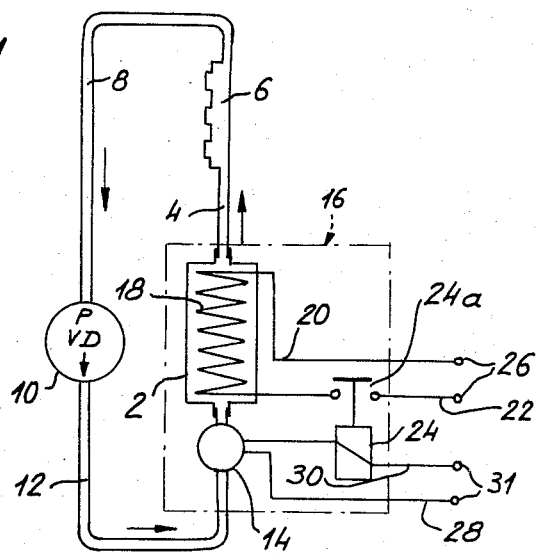
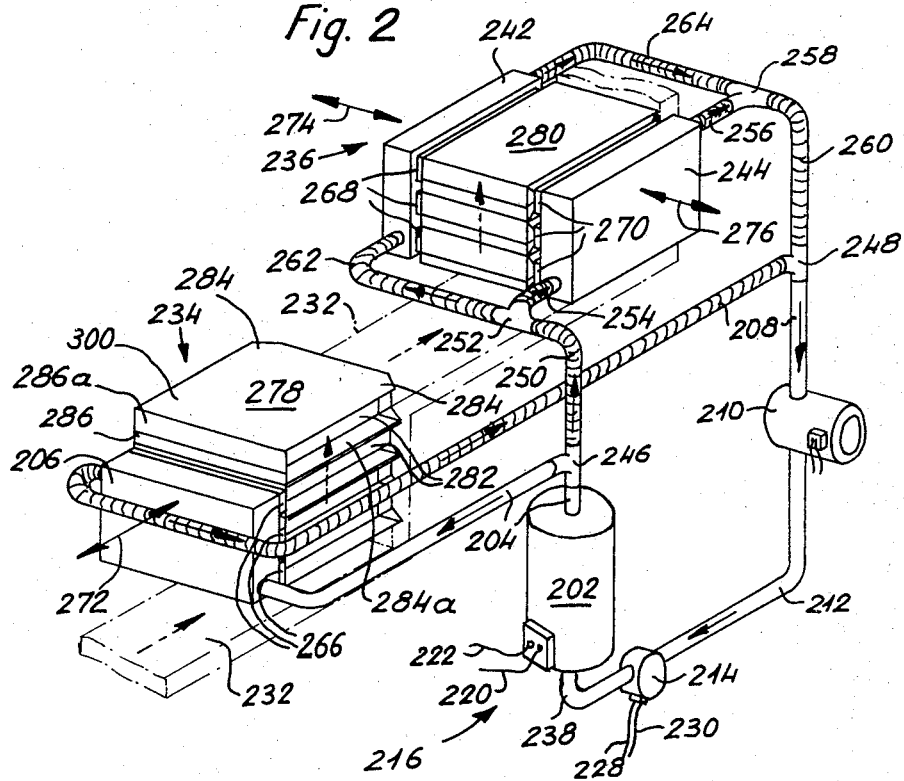
INVENTOR.
GÜNTER WAHLE
BY
Michael J. Striker
his ATTORNEY United States Patent Office 3,521,031
Patented July 21, 1970

3,521,031
HEAT SEALING APPARATUS
Guenter Wahle, Hamburg-Bramfeld, Germany, assignor to Hauni-Werke Koerber & Co. KG., Hamburg-Bergedorf, Germany
Filed Sept. 21, 1966, Ser. No. 580,958
Claims priority, application Great Britain, Nov. 22, 1965, 49,486/65
Int. Cl. H05b 1/00
U.S. Cl. 219—243                                   3 Claims

ABSTRACT OF THE DISCLOSURE

A heat sealing apparatus for use in cigarette packing machines to seal sheets of thermoplastic material which form envelopes of cigarette packs comprises a system of conduits defining an endless path for a supply of fluid and containing one or more welding elements which withdraw heat from the fluid during welding, and a regulating device including a variable delivery pump which circulates the fluid and a heat exchanger which heats the circulating fluid. The rate of circulation and the heating action are such that the amount of heat flowing through the welding element or elements per unit of time is a multiple of the amount of heat which is withdrawn by the welding elements.

---

The present invention relates to heat sealing apparatus, and more particularly to improvements in apparatus which may be utilized to heat seal or weld envelopes of cigarette packs or the like, especially to seal transparent outer envelopes which are applied around substantially box-shaped commodities and consist of synthetic thermoplastic material.

It is well known to provide cigarette packs, cigar packs and similar box-shaped commodities with outer wrappers or envelopes of transparent or translucent synthetic thermoplastic material so that the envelopes will protect the inner envelopes (normally including a foil of sheet metal accommodated in a wrapper of paperboard or paper) but will permit for reading of inscriptions and other indicia on the inner envelopes. In many instances, such transparent or translucent outer envelopes are further provided with tear strips to facilitate their opening without breaking the seals between the overlying flaps of the envelopes. Apparatus for heat sealing the overlying or abutting flaps of thermoplastic envelopes normally comprise electrically heated welding electrodes which heat the flaps to fusion temperature.

A serious drawback of presently known heat sealing apparatus is that the welding or heat sealing temperature cannot be maintained within a relatively narrow range which is best suited for satisfactory welding of overlying or abutting flaps. For example, certain types of thermoplastic sheet stock can be properly sealed within a temperature range of ±5° C. of an optimum temperature. Such narrow ranges are difficult to maintain excepting by resorting to exceptionally complicated, costly and bulky electronic control systems which are prone to malfunction.

Accordingly, it is an important object of the present invention to provide a heat sealing apparatus which may be used with advantage in the packaging machines for cigarettes and like articles and which is constructed in such a way that it can readily maintain the temperature of one or more welding or analogous heat dissipating elements within a desired range.

Another object of the invention is to provide a heat sealing apparatus which occupies little room, wherein the temperature of the heat dissipating element or elements may be controlled and maintained within a desired range by resorting to simple and reliable heat transmitting and temperature measuring instrumentalities, and which can be readily installed in presently known packaging machines or in other assemblies wherein sheets or foils of heat sealable material are being processed to form envelopes, containers and similar articles.

A further object of the invention is to provide a heat sealing apparatus for use in cigarette packaging machines and the like wherein the heat dissipating elements are not directly heated by electric current.

An additional object of the present invention is to provide a heat sealing apparatus which can maintain its heat dissipating element or elements at a requisite temperature despite the fact that such element or elements might dissipate heat at frequent intervals and that the amounts of heat required by such element or elements may change at regular or irregular intervals.

Briefly stated, one feature of the present invention resides in the provision of a heat sealing apparatus which, as outlined above, is particularly suited to apply heat to and to thereby seal or close envelopes which are draped around cigarette packs or the like. The improved apparatus comprises conduit means containing a supply of fluid and defining an endless path in which such fluid can circulate in a selected direction, heat dissipating means installed in the conduit means to define a portion of the aforementioned endless path and to withdraw heat from the fluid whereby the thus withdrawn heat may be dissipated during welding of overlying or abutting flaps on transparent envelopes consisting of synthetic thermoplastic material or of flaps on envelopes which are coated with a substance capable of forming a bond in response to the application of heat, and regulating means for maintaining the temperature of fluid which enters the heat dissipating means above a predetermined value. The regulating means comprises a suitable pump or analogous circulating means for conveying the fluid in the aforementioned selected direction, and heating means for subjecting the fluid which flows toward the heat dissipating means to a heating action in response to a drop in fluid temperature below the predetermined value.

In accordance with another feature of the present invention, the amount of heat in the fluid which flows through the heat dissipating means per unit of time exceeds substantially and is preferably a multiple of the amount of heat that is withdrawn from the fluid by the heat dissipating means during the same unit of time. This insures that the temperature of circulating fluid fluctuates very little and that such temperature may be rapidly raised to and maintained at the desired optimum value. For the same reason, and if the heat dissipating means comprises two or more heat dissipating elements, the conduit means preferably comprises two or more parallel branches each of which may contain a separate heat dissipating element or a battery of such heat dissipating elements. This is normally the case in a heat sealing apparatus for transparent outer envelopes of cigarette packs wherein the packs are wrapped in a manner as disclosed, for example, in U.S. Letters Patent No. 3,200,555 to Kurt Liedtke and wherein each envelope comprises three welded seams.

The novel features which are considered as characteristic of the invention are set forth in particular in the appended claims. The improved heat sealing apparatus itself, however, both as to its construction and its mode of operation, together with additional features and advantages thereof, will be best understood upon perusal of the following detailed description of certain specific embodiments with reference to the accompanying drawings, in which:

FIG. 1 is a schematic illustration of a heat sealing apparatus which embodies the present invention; and FIG. 2 is a perspective view of a modified heat sealing apparatus which is installed in a cigarette packaging machine.

Referring first to FIG. 1, there is shown a heat sealing apparatus which embodies one form of my invention and comprises a system of conduits 4, 8, 12 which define an endless path and contain a supply of suitable fluid, for example, steam, oil or water. The nature and temperature of fluid which fills these conduits will depend on the desired temperature of a heat dissipating element 6 which may constitute a welding or bonding jaw and can be utilized to seal to each other successive pairs of overlying or abutting flaps which consist of synthetic thermoplastic material or are coated with a substance capable of forming a satisfactory bond in response to the application of pressure and/or heat. The fluid is circulated through the conduits 4, 8, 12 and through the heat sealing element 6 by a circulating means 10 which may be constituted by an electrically operated variable delivery pump and is installed between the conduits 8 and 12. In the apparatus of FIG. 1, the fluid is assumed to be conveyed in a counterclockwise direction as indicated by the arrows.

In order to make sure that the temperature of the heat dissipating element 6 will be maintained within a desired range, i.e., that such temperature will not drop below a predetermined minimum value, the apparatus of FIG. 1 further comprises a heating means which is denoted by the numeral 16 and together with the pump 10 constitutes a regulating means for controlling the temperature of fluid which flows into and through the heat dissipating element 6. The heating means 16 comprises a reservoir or tank 2 which is connected between the conduits 12 and 4 upstream of the heat dissipating element 6 and is filled with fluid. This reservoir accommodates a heat exchanger 18 which is shown in the form of a coiled electric resistance heater having conductors 20, 22 extending from the reservoir 2 and connected with the poles of a first source 26 of electrical energy. The conductor 22 contains an electric switch 24a forming part of a relay 24 whose winding is connected with conductors 28, 30 which are further connected to the poles of a second source 31 of electrical energy. The conductor 28 contains a detector 14 of known design which is installed in the conduit 12 immediately upstream of the reservoir 2, i.e., as close to the reservoir as possible in order to measure the temperature of fluid shortly before such fluid enters the reservoir 2 and comes into heat exchanging contact with the heater 18. In a manner well known from the art, the detector 14 will complete the circuit of the relay 24 when the temperature of fluid in the conduit 12 drops below a predetermined value, and the thus energized relay then closes its switch 24a to complete the circuit of the heater 18 which supplies heat to the fluid flowing through the reservoir 2.

It is clear that the apparatus of FIG. 1 will operate properly if the relay 24 is deenergized when the switch 24a is to close. Thus, the detector 14 can either complete or open the circuit of the relay 24 when the temperature of fluid in the conduit rises to a predetermined value, as long as such change in the condition of energization of the relay brings about an opening of the switch 24a.

While the fluid which flows through the reservoir 2 could be heated by resorting to other types of heat exchangers, for example, to a coil for a circulating fluid medium, the electric heater 18 has been found to be very satisfactory because it responds immediately and can be turned on or off by resorting to simple control devices. The capacity of the reservoir 2 should be sufficient to insure that the fluid flowing from the conduit 12 into the conduit 4 will remain in the reservoir long enough to take up sufficient heat prior to entry into the heat dissipating element 6.

The operation of the heat sealing apparatus shown in FIG. 1 is as follows:

In order to start the apparatus, the motor of the pump 10 is started so that the pump conveys the fluid in a counterclockwise direction. The fluid is cold (i.e., its temperature is below a predetermined optimum temperature which is necessary to maintain the temperature of the heat dissipating element 6 within a desired range). The circuit of the relay 24 is completed by the detector 14 because the fluid is cold so that the switch 24a completes the circuit of the heater 18 which heats the fluid flowing through the reservoir 2. When the temperature of the circulating fluid reaches a desired value, for example, 120° C., the detector 14 automatically opens the circuit of the relay 24 which is deenergized so that its switch 24a opens the circuit of the heater 18. From then on, the relay 24 will be energized only when the temperature of fluid in the conduit 12 drops below 120° C.

The throughput of the pump 10 is selected in such a way that the amount of heat in the fluid which flows through the heat dissipating element 6 during any unit of time exceeds considerably and is preferably a multiple of the amount of heat which is being dissipated by the element 6, i.e., which is being used up to weld the flaps of successive envelopes to each other. The capacity of the heater 18 to heat the fluid in the reservoir 2 is such that this heater can maintain the entire body of fluid in the endless path defined by the parts 2, 4, 6, 8, 10 and 12 within a desired temperature range.

If desired, the conduit 8 may accommodate a second detector which measures the temperature of fluid issuing from the heat dissipating element 6 and adjusts the pump 10 in a sense to reduce the speed at which the fluid circulates if the temperature of fluid leaving the element 6 exceeds a given maximum value.

FIG. 2 illustrates a portion of a cigarete packaging machine which embodies or is combined with a modified heat sealing apparatus. The packaging machine comprises a conveyor 232 which advances cigarette packs 282 along an elongated path and past a series of heat dissipating elements in the form of welding jaws 206, 242, 244. The conveyor 232 comprises two vertical ducts 234, 236 which respectively accommodate stacks 278 and 280 of cigarette packs 282. Each such pack comprises an array of preferably twenty cigarettes or filter cigarettes and an envelope including an inner wrapper of metallic foil and an outer wrapper of paperboard. Prior to their entry into the lowermost zone of the first duct 234, successive packs 282 are wrapped into blanks of heat-sealable transparent synthetic thermoplastic material so that such blanks form outer envelopes 300 each having two rear flaps 286, 286a and two pairs of lateral flaps 284, 284a. Each rear flap 286a is made to overlie the adjoining rear flap 286 not later than at the time such rear flaps reach the first welding jaw 206. This jaw has three welding bars 266 which then transmit to the overlying flaps 286a in the duct 234 sufficient amounts of heat to weld such flaps to the underlying flaps 286 before the respective envelopes 300 emerge at the upper end of the duct 234 and are conveyed into the lower zone of the second duct 236. The packs 282 are advanced intermittently and the welding jaws 206, 242, 244 are movable toward and away from the respective flaps so that their bars 266, 268, 270 transmit heat by direct contact with envelopes during the intervals between successive advances of the packs. The directions in which the jaws 206, 242, 244 are reciprocable are respectively indicated by double-headed arrows 272, 274, 276. The conveyor 232 comprises suitable pushers, rams and/or analogous transporting components which can intermittently lift the stacks 278, 280 so that a fresh pack 282 (with an envelope 300 draped therearound) can be introduced into the lower zone of the first duct 234 at the time the uppermost pack of the stack 278 is advanced into the lower zone of the second duct 236 and while the uppermost pack of the stack 280 is removed from the duct 236 to be advanced on to storage, to a carton filling machine or to another destination.

The heat sealing apparatus of FIG. 2 comprises the aforementioned welding jaws 206, 242, 244 which together constitute a composite heat dissipating means and are installed in three parallel branches of a system of conduits defining an endless path for the circulation of a suitable fluid. The heat sealing apparatus further comprises a regulating means including a variable delivery electric pump 210 and a heating means 216 including a reservoir 202 and a detector 214. The first branch of the aforementioned system of conduits includes a conduit 204 which connects the outlet of the reservoir 202 with the intake end of the welding jaw 206, a second conduit 208 which connects the discharge end of the welding jaw 206 with the suction intake of the pump 210, a third conduit 212 which connects the pressure outlet of the pump 210 with the detector 214, and a fourth conduit 238 which connects the detector 214 with the inlet of the reservoir 202. The second branch includes a T 246 in the conduit 204 just downstream of the reservoir 202, a conduit 250 connecting the T 246 with a second T 252, a conduit 254 connecting the second T 252 with the intake end of the welding jaw 244, a conduit 256 connecting the discharge end of the welding jaw 244 with a third T 258, and a further conduit 260 connecting the T 258 with a T 248 in the conduit 208 just upstream of the pump 210. The third branch comprises a conduit 262 connecting the T 252 with the intake end of the welding jaw 242 and a conduit 264 connecting the discharge end of the jaw 242 with the T 258.

Conductors 228, 230 connect the detector 214 with the winding of the relay 24 (not shown) and with the source 31. The conductors 220, 222 are connected with the electric heat exchanger in the reservoir 202 (corresponding to the heat exchanger 18 of FIG. 1) and with a second source of electrical energy corresponding to the source 26. The manner in which the switch 24a of the relay 24 is connected in the circuit of the heat exchanger in the reservoir 202 is the same as shown in FIG. 1.

The welding jaw 206 bounds one side of the first duct 234 and each of the jaws 242, 244 bounds one side of the second duct 236. Some or all of the conduits shown in FIG. 2 are flexible, either in their entirely or in part, to allow for reciprocatory movements of the welding jaws. If desired, only the bars of the welding jaws will be movable toward and away from the adjoining envelopes 300.

The pump 210 will be started simultaneously with or ahead of the conveyor 232 so that the fluid begins to circulate and flows through the welding jaws 206, 242, 244. The manner in which the fluid is heated is the same as described in connection with FIG. 1, i.e., the circuit of the heat exchanger in the reservoir 202 will remain completed until the temperature of fluid flowing from the conduit 212 into the conduit 238 rises to a predetermined value. From then on, the heat exchanger will be operated intermittently in response to signals generated by the detector 214.

The conveyor 232 advances the packs 282 in the aforedescribed manner so that the packs travel in stepwise fashion, and the welding jaws 206, 242, 244 are moved in synchronism with the conveyor to advance their bars 266, 268, 270 into actual contact with and away from the flaps on the adjoining packs. The various blank applying, draping, tucking and other folding instrumentalities are of known design and are not shown in FIG. 2. Reference may be had to the aforementioned patent to Liedtke which fully discloses such instrumentalities.

In the apparatus of FIG. 2, each of the three welding jaws 206, 242, 244 engages more than a single pair of flaps at a time. However, it is equally within the purview of the present invention to provide each of these jaws with a single bar, with two bars, or with four or more bars so that such jaws can engage a single pair of flaps or two, four or more pairs of flaps at a time. In the illustrated embodiment, the temperature of bars 266, 268, 270 is selected in such a way that the flaps are properly welded in response to repeated contact with the bars.

An important advantage of the heat sealing apparatus which is shown in FIG. 2 is that all of the welding jaws can be maintained at the same temperature. This is due to the provision of a system of conduits which comprises three parallel branches each of which accommodates one of the jaws. Thus, fluid which has been cooled during passage through the jaw 206 does not enter the other two jaws, or vice versa, prior to being returned into the reservoir 202 where it is heated if necessary so that each of the welding jaws invariably receives streams of fluid which is maintained at a desired temperature. The pump 210 may be adjusted to reduce the speed of circulating fluid if the temperature of such fluid rises above a maximum permissible value.

The circulating fluid used should have good heat transfer properties; preferably its boiling point should be over 200° C.

In this respect, glycerol, high-temperature oils etc. represent suitable media.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. A heat sealing apparatus, particularly for welding by the application of heat sheets of synthetic thermoplastic material which constitute envelopes of cigarette packs and the like, comprising conduit means containing a supply of fluid and defining an endless path in which such fluid can circulate in a selected direction, said conduit means comprising a plurality of parallel branches; heat dissipating means installed in said conduit means to withdraw heat from the fluid, said heat dissipating means comprising at least one welding element installed in each of said branches; and regulating means for maintaining the temperature of fluid which enters said heat dissipating means above a predetermined value, said regulating means comprising circulating means for conveying the fluid in said selected direction and heating means for subjecting the fluid which flows toward said heat dissipating means to a heating action in response to a drop in fluid temperature below said predetermined value.

2. In a packing machine, a heat sealing apparatus, particularly for welding by the application of heat sheets of synthetic thermoplastic material which constitute envelopes of cigarette packs or the like, comprising conduit means containing a supply of fluid and defining an endless path in which such fluid can circulate in a selected direction, said conduit means comprising a plurality of parallel branches; heat dissipating means including at least one welding element installed in each of said branches to withdraw heat from the fluid; and regulating means for maintaining the temperature of fluid which enters said heat dissipating means above a predetermined value, said regulating means comprising circulating means for conveying the fluid in said selected direction and heating means for subjecting the fluid which flows toward said heat dissipating means to a heating action in response to a drop in fluid temperature below said predetermined value, said circulating and heating means being arranged to circulate and heat the fluid in such a way that the amount of heat in the fluid flowing through said heat dissipating means per unit of time exceeds substantially the amount of heat which is withdrawn from the fluid by said heat dissipating means.

3. In a packing machine, a heat sealing apparatus, particularly for welding by the application of heat sheets of synthetic thermoplastic material which constitute envelopes of cigarette packs or the like, comprising conduit means containing a supply of fluid and defining an endless path in which such fluid can circulate in a selected direction; heat dissipating means including at least one welding element installed in said conduit means to withdraw heat from the fluid; and regulating means for maintaining the temperature of fluid which enters said heat dissipating means above a predetermined value, said regulating means comprising circulating means for conveying the fluid in said selected direction and heating means for subjecting the fluid which flows toward said heat dissipating means to a heating action in response to a drop in fluid temperature below said predetermined value, said circulating and heating means being arranged to circulate and heat the fluid in such a way that the amount of heat in the fluid flowing through said heat dissipating means per unit of time exceeds substantially the amount of heat which is withdrawn from the fluid by said heat dissipating means, said heating means comprising a reservoir installed in said conduit means upstream of said heat dissipating means, a heat exchanger including an electric heating unit provided in said reservoir, detector means provided in said conduit means upstream of said reservoir for measuring the temperature of fluid, and means for operating said heating unit in response to measurements carried out by said detector means and indicating a drop in fluid temperature below said predetermined value, said heat exchanger further comprising a source of electrical energy connected in circuit with said heating unit and said operating means comprising a relay connected in said circuit, said detector means being arranged to change the condition of energization of said relay and to thus complete said circuit when the temperature of fluid drops below said predetermined value.

References Cited

UNITED STATES PATENTS

| | | | |
|---|---|---|---|
| 1,655,277 | 1/1928 | Madsen | 237—63 |
| 2,466,735 | 4/1949 | Piazze | 156—583 X |
| 2,700,505 | 1/1955 | Jackson | 236—9 |
| 2,745,941 | 5/1956 | McElhoney | 219—341 |
| 3,295,167 | 1/1967 | Corbin | 156—583 X |

JOSEPH V. TRUHE, Primary Examiner

C. L. ALBRITTON, Assistant Examiner

U.S. Cl. X.R.

53—33, 39